United States Patent
Pausch et al.

[11] Patent Number: 6,146,720
[45] Date of Patent: *Nov. 14, 2000

[54] ELECTRO-OPTICAL LIQUID-CRYSTAL DISPLAY

[75] Inventors: Axel Pausch, Seeheim; Eike Poetsch, Mühltal; Kazuaki Tarumi, Seeheim; Anja Huth, Riedstadt; Andreas Wächtler, Tübingen; Andreas Beyer, Hanau; Brigitte Schuler, Grossostheim; Volker Reiffenrath, Rossdorf; Matthias Bremer, Darmstadt; Michael Kompter, Riedstadt, all of Germany

[73] Assignee: Merck Patent Gesellschaft mit, Germany

[*] Notice: This patent is subject to a terminal disclaimer.

[21] Appl. No.: 09/412,566

[22] Filed: Oct. 5, 1999

Related U.S. Application Data

[63] Continuation of application No. 08/875,745, filed as application No. PCT/EP96/00239, Jan. 22, 1996, Pat. No. 5,993,691.

[30] Foreign Application Priority Data

Feb. 3, 1995 [DE] Germany .............. 195 03 507

[51] Int. Cl.⁷ .............. C09K 19/00; C09K 19/30; C09K 19/12; C09K 19/20
[52] U.S. Cl. .............. 428/1.1; 252/299.63; 252/299.66; 252/299.67
[58] Field of Search .............. 252/299.63, 299.66, 252/299.67; 428/1.1

[56] References Cited

U.S. PATENT DOCUMENTS

| | | |
|---|---|---|
| 5,463,482 | 10/1995 | Jones . |
| 5,519,525 | 5/1996 | Weber et al. .............. 359/103 |
| 5,578,241 | 11/1996 | Plach et al. .............. 252/299.01 |
| 5,591,525 | 1/1997 | Weber et al. . |
| 5,618,466 | 4/1997 | Tomi et al. . |
| 5,716,543 | 2/1998 | Schlosser et al. . |
| 5,718,840 | 2/1998 | Plach et al. . |
| 5,725,799 | 3/1998 | Bremer et al. . |
| 5,730,904 | 3/1998 | Bartmann et al. . |
| 5,733,477 | 3/1998 | Kondo et al. . |
| 5,746,941 | 5/1998 | Rieger et al. .............. 252/299.63 |
| 5,762,828 | 6/1998 | Tanaka et al. . |
| 5,792,387 | 8/1998 | Hachiya et al. . |
| 5,958,290 | 9/1999 | Coates et al. .............. 252/299.01 |

FOREIGN PATENT DOCUMENTS

| | | |
|---|---|---|
| 588568 | 3/1994 | European Pat. Off. . |
| 667555 | 2/1995 | European Pat. Off. . |
| 673986 | 3/1995 | European Pat. Off. . |

OTHER PUBLICATIONS

Translation of JP 7–181439, Jul. 1995.

*Primary Examiner*—C. H. Kelly
*Attorney, Agent, or Firm*—Millen, White, Zelano & Branigan, P.C.

[57] ABSTRACT

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound [lacuna] a structural unit of the formula 2

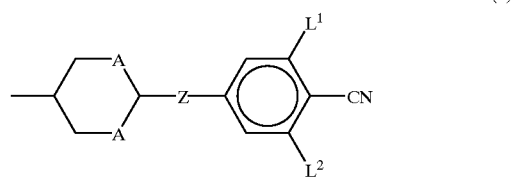

(2)

in which
  A is O or CH,
  Z is —COO— or a single bond
  $L^1$ is F or, if A is O, is alternatively H, and
  $L^2$ is H or F.

21 Claims, No Drawings

ELECTRO-OPTICAL LIQUID-CRYSTAL DISPLAY

This is a continuation of application Ser. No. 08/875,745 filed as PCT/EP96/00239 Jan. 22, 1996 now U.S. Pat. No. 5,993,691.

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound [lacuna] a structural unit of the formula 2

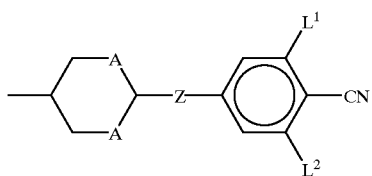
(2)

in which
  A is O or CH,
  Z is —COO— or a single bond
  $L^1$ is F or, if A is O, is alternatively H, and
  $L^2$ is H or F.

In conventional liquid-crystal displays (TN, STN, OMI or AMD-TN), the electric fields for realignment are generated essentially perpendicular to the liquid-crystal layer.

International patent application WO 91/10936 discloses a liquid-crystal display in which the electric signals are generated in such a way that the electric fields have a significant component parallel to the liquid-crystal layer (IPS, in-plane switching). The principles of operating such a display are described, for example, by R. A. Soref in Journal of Applied Physics, vol. 45, No. 12, pp. 5466–5468 (1974).

EP 0 588 568 discloses various ways of addressing a display of this type.

These IPS displays can be operated with liquid-crystalline materials either of positive or of negative dielectric anisotropy ($\Delta\epsilon \neq 0$). However, using the materials known hitherto, relatively high threshold voltages and long response times are achieved in IPS displays. The object was therefore to indicate liquid-crystalline materials which are suitable for achieving relatively low threshold voltages and short response times in IPS displays.

Surprisingly, this object has been achieved by the use of liquid-crystalline materials comprising at least one compound containing a 3,4,5-trifluorophenyl group and/or comprising at least one mesogenic compound [lacuna] a structural unit of the formula 2

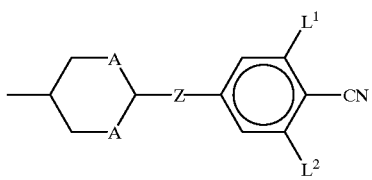
(2)

in which
  A is O or CH,
  Z is —COO— or a single bond
  $L^1$ is F or, if A is O, is alternatively H, and
  $L^2$ is H or F.

Compounds of this type are disclosed, for example, in EP 0 387 032 and WO 91/03450.

However, there is no indication therein that the threshold voltages and the response times of IPS displays can be improved with the aid of these substances.

The invention therefore relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound [lacuna] a structural unit of the formula 2

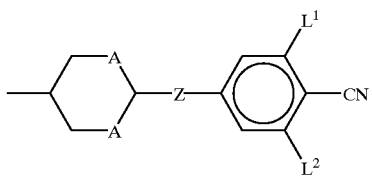
(2)

in which
  A is O or CH,
  Z is —COO— or a single bond
  $L^1$ is F or, if A is O, is alternatively H, and
  $L^2$ L is H or F.

Preferred embodiments are IPS displays in which
a) the medium comprises at least one compound of the formula I;

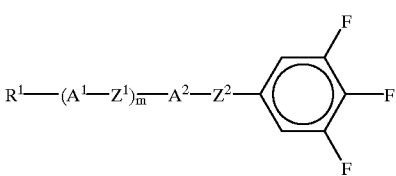
(I)

in which
  R is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

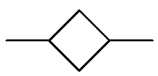

—CO—, —CO—O—, —O—CO— or —O—CO—O— in such a way that O atoms are not linked directly to one another, A² and A² are each, independently of one another,
(a) trans-1,4-cyclohexylene radical or 1,4-cyclohexenylene radical, in which, in addition, one or more non-adjacent $CH_2$ groups may be replaced by —O— and/or
(b) 1,4-phenylene radical, in which, in addition, one or two CH groups may be replaced by N,
(c) radical from the group consisting of 1,4-dicyclo(2,2,2)octylene, piperidine-1,4-diyl, naphthalene-2,6-diyl, deca-hydronaphthalene-2,6-diyl and 1,2,3,4-tetrahydronaphthalene-2,6-diyl, where the radicals (a) and (b) may be substituted by one or two fluorine atoms, $Z^1$ and $Z^2$ are each, independently of one another, —CO—O—, —O—CO—, —$CH_2$O—, —O$CH_2$—, —$CH_2CH_2$—, —CH=CH—, —C≡C—, or a single bond, or one of the radicals $Z^1$ and $Z^2$ is —$(CH_2)_4$— or —CH=CH—$CH_2CH_2$—, and m is 0, 1 or 2;

b) the medium comprises at least one compound containing a group of the formula 3:

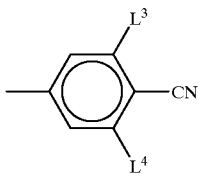

(3)

in which
$L^3$ and $L^4$ are each H or F,
in particular where the medium comprises at least one compound of the formula II

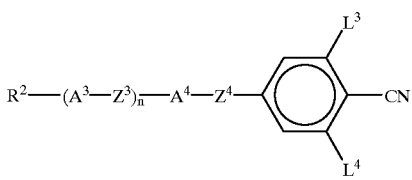

II in which
$L^3$ and $L^4$ are as defined above, in particular in which $L^3$ is F and $L^4$ is H or F,
$R^2$ is as defined for $R^2$, and
$A^3$ and $A^4$ are each, independently, as defined for $A^1$ and $A^2$,
$Z^3$ and $Z^4$ are each, independently of one another, as defined for $Z^1$ and $Z^2$, and
n is 0, 1 or 2, preferably 0;

c) the medium has a dielectric anisotropy Δε of >8.5, preferably between 6.8 and 14, in particular between 8.7 and 13.5;

d) the medium comprises at least one compound selected from the formulae IIa to IIc

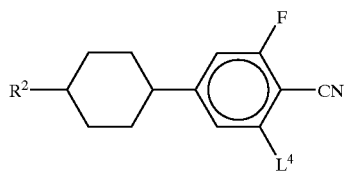

IIa

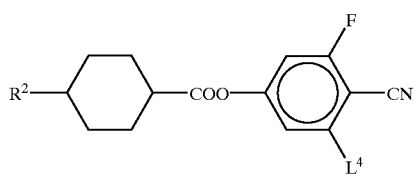

IIb

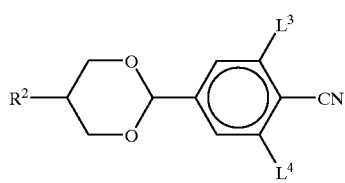

IIc in which $R^2$, $L^3$ and $L^4$ are in each case as defined above;

e) the medium comprises at least one compound of the formula III

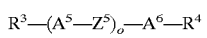

$R^3$—$(A^5—Z^5)_o$—$A^6$—$R^4$      III in which
$R^3$ and $R^4$ are each, independently of one another, as defined for $R^1$,
$A^5$ and $A^6$ are each, independently of one another, as defined for $A^1$ and $A^2$,
$Z^5$ is in each case, independently of the others, as defined for $Z^1$ and $Z^2$, and
o is 1, 2 or 3;

f) the medium comprises at least one compound of the formula IV

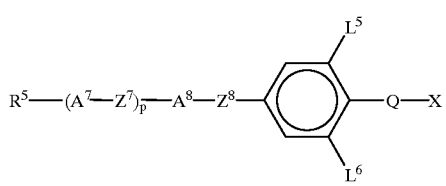

IV in which
$R^5$ is as defined for $R^1$,
$A^7$ and $A^8$ are each, independently of one another, as defined for $A^1$ and $A^2$,
$Z^7$ and $Z^8$ are each, independently of one another, as defined for $Z^1$ and $Z^2$,
$L^5$ and $L^6$ are each, independently of one another, H or F,
Q is a polyfluoroalkylene radical of the formula

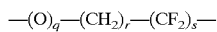

in which
q is 0 or 1
r is 0 or an integer between 1 and 6 and
s is an integer between 1 and 6,
X is H, F or Cl, and
p is 0, 1 or 2.

Preference is furthermore given to an IPS display in which the pixels are addressed by means of an active matrix.

The invention furthermore relates to a liquid-crystalline medium of positive dielectric anisotropy which comprises at least one compound containing a 3,4,5-trifluorophenyl group, preferably a compound of the formula I, and at least one compound containing a group of the formula (3), preferably a group of the formula (2), in particular a compound of the formula II, in particular which comprises from 10 to 60% by weight, preferably from 15 to 40% by weight, of at least one compound of the formula I, from 15 to 40% by weight, preferably from 20 to 35% by weight, of at least one compound of the formula II, from 20 to 55% by weight, preferably from 25 to 50% by weight, of at least one compound of the formula (III), and from 0 to 30% by weight, preferably from 20 to 25% by weight, of a compound of the formula IV.

The novel liquid-crystalline medium preferably comprises:

at least one compound selected from the formulae Ia and Ib

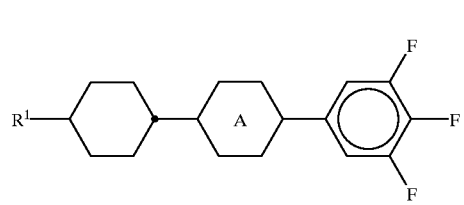

at least one compound selected from the formulae II1, II2, II3 and II4,

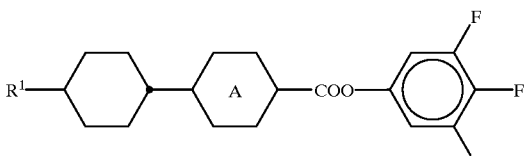

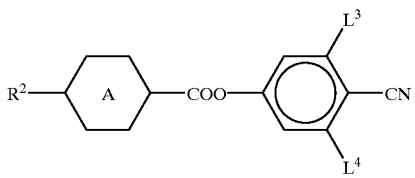

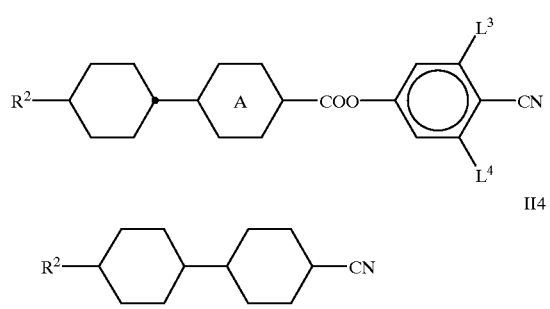

at least one compound selected from the formulae IIIa, IIIb and IIIc,

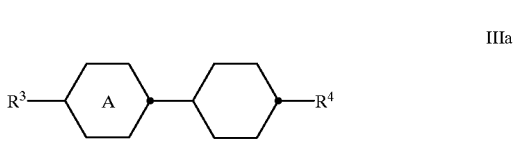

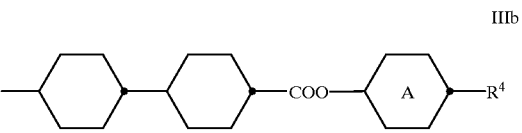

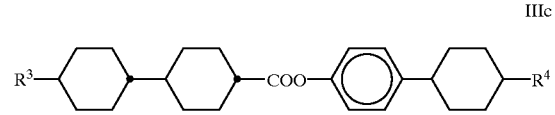

and if desired, at least one compound selected from the formulae IVa and IVb,

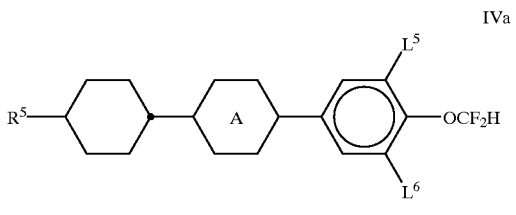

-continued

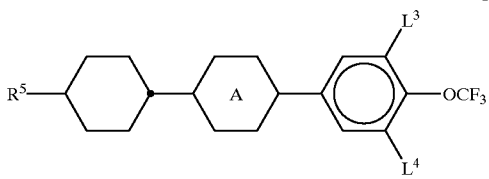

in which

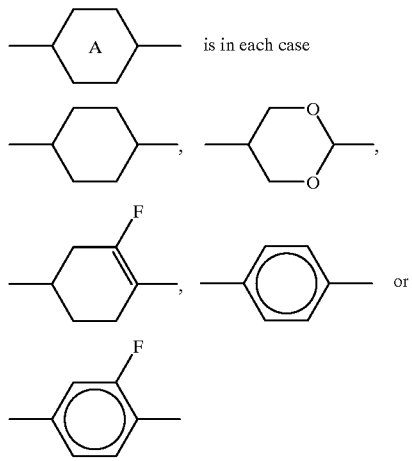 is in each case

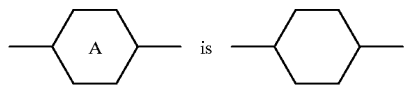 or

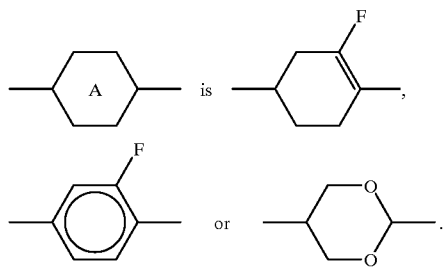

and $R^1, R^2, R^3, R^4, R^5, L^1, L^2, L^3$, and $L^4$ are each as defined above.

In a particularly preferred embodiment, the novel media comprise at least one compound of the formula Ia in which

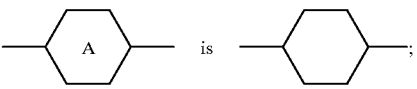

and at least one compound of the formula Ia in which

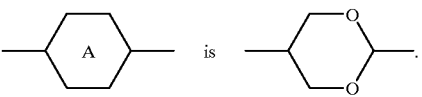

In a further preferred embodiment, the novel media comprise at least one compound of the formula Ia and at least one compound of the formula Ib.

Preference is furthermore given to media comprising at least one compound of the formula IIa in which $L^3$ is F and L is H or F and

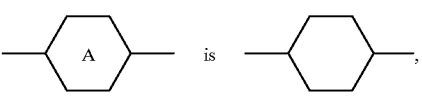

or compounds of the formula IIa, in which $L^3$ and $L^4$ are H or F and

The novel media particularly preferably comprise a compound of the formula IIb in which and $L^3$ is F.

The novel liquid-crystalline media generally have a birefringence ($\Delta n$) of <0.12, preferably between 0.07 and 0.1, in particular between 0.08 and 0.09.

The viscosity (at 20° C.) of the novel materials is generally less than 30 mm$^2$ s$^{-1}$, in particular between 15 and 25 mm$^2$ s$^{-1}$. The resistivity of the novel materials at 20° C. is generally between $5\times10^{10}$ and $5\times10^{13}$ $\Omega\cdot$cm, particularly preferably between $5\times10^{11}$ and $5\times10^{12}$ $\Omega\cdot$cm.

It has been found that even a relatively small proportion of compounds of the formula I in a mixture with conventional liquid-crystal materials, but in particular with one or more compounds of the formula II, III and/or IV, results in a significant lowering of the threshold voltage and in fast response times, with at the same time broad nematic phases having low smectic-nematic transition temperatures being observed. The compounds of the formulae I to IV are colorless, stable and readily miscible with one another and other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Group [sic] having 2–5 carbon atoms are generally preferred.

The term "alkenyl" covers straight-chain and branched alkenyl groups having 2–7 carbon atoms, in particular the straight-chain groups. Particular alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are to be preferred.

The term "fluoroalkyl" preferably covers the straight-chain groups having a terminal fluorine atom, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of $R^1$ and $R^5$, the response times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter response times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally result in lower threshold voltages and smaller values of $k_{33}/k_{11}$ compared with alkyl and alkoxy radicals.

A —$CH_2CH_2$— group in $Z^1$ or $Z^2$ generally results in higher values of $k_{33}/k_{11}$ compared with a single covalent bond. Higher values of $k_{33}/k_{11}$ facilitate, for example, flatter transmission characteristic lines in TN cells having a 90° twist (for achieving gray shades) and steeper transmission characteristic lines in STN, SPE and OMI cells (greater multiplexibility), and vice versa.

The optimum mixing ratio between the compounds of the formulae I and II+III+IV depends substantially on the desired properties, on the choice of the components of the formulae I, II, III and/or IV and on the choice of any other components present. Suitable mixing ratios within the abovementioned range can easily be determined from case to case.

The total amount of compounds of the formulae I to IV in the novel mixtures is not crucial. The mixtures may therefore contain one or more further components in order to optimize various properties. However, the observed effect on the response times and the threshold voltage is generally higher the greater the total concentration of compounds of the formulae I and II.

In a particularly preferred embodiment, the novel media comprise compounds of the formula IV, (preferably II and/or III) in which Q—X is $OCF_3$ or $OCHF_2$. A favorable synergistic effect with the compounds of the formula I results in particularly advantageous properties.

The novel liquid-crystalline media preferably comprise 2 to 40, in particular 4 to 30, components as further constituents besides one or more compounds of the formulae I, II, II [sic] and IV. These media very particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes optionally halogenated stilbenes, benzyl phenyl ethers, tolans and substituted cinnamic acids. The 1,4-phenylene groups in these compounds may also be fluorinated.{PRIVATE }

The most important compounds suitable as further constituents of novel media can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—$CH_2CH_2$—E—R" | 4 |
| R'—L—C≡C—E—R" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene [sic], Pyr is pyrimidine-2,5-diyl or pyridine-2,5-diyl, Dio is 1,3-dioxane-2,5-diyl and C is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The novel media preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is called group A below, and the compounds are labeled with the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, R" is —F, —Cl, —NCS or —$(O)_iCH_{3-(k+1)}F_kCl_l$, where i is 0 or 1, and k+1 is 1, 2 or 3; the compounds in which R' has this meaning are labeled with the sub-formulae 1b, 2b, 3b, 4b and 5b. Particular preference is given to those compounds of the sub-formulae 1b, 2b, 3b, 4b and 5b in which R" is —F, —Cl, —NCS, —$CF_3$, —$OCHF_2$ or —$OCF_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known as group C below, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds of groups A, B and C, other compounds of the formulae 1, 2, 3, 4 and 5 having other variants of the proposed substituents are also customary. All these substances can be obtained by methods which are known from the literature or analogously thereto.

Besides compounds of the formula I according to the invention, the novel media preferably contain one or more compounds selected from group A and/or group B and/or group C. The proportions by weight of the compounds from these groups in the novel media are preferably Group A: 0 to 90%, preferably 20 to 90%, in particular 30 to 90%

Group B: 0 to 80%, preferably 10 to 80%, in particular 10 to 65%

Group C: 0 to 80%, preferably 5 to 80%, in particular 5 to 50%, the sum of the proportions by weight of the group A and/or B and/or C compounds present in the particular novel media preferably being 5%–90% and in particular 10% to 90%.

The novel media preferably comprise 1 to 40%, particularly preferably 5 to 30%, of compounds according to the invention. Further preferred media are those which contain more than 40%, in particular 45 to 90%, of compounds according to the invention. The media preferably contain three, four or five compounds according to the invention.

The structure of the IPS display according to the invention corresponds to the usual construction for such displays, as described, for example, in WO 91/10936 or EP 0 588 568. The term conventional construction is broadly drawn here and also covers all derivatives and modifications of the IPS display, in particular, for example, including matrix display elements based on poly-Si TFT or MIM.

However, an essential difference between the displays according to the invention and those conventional hitherto is in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives known to the person skilled in the art and described in the literature. For example, 0–15% of pleochroic dyes or chiral dopants can be added.

C denotes a crystalline phase, S a smectic phase, $S_B$ a smectic B phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and no the refractive index (in each case at 589 nm). $\Delta\epsilon$ denotes the dielectric anisotropy ($\Delta\epsilon=\epsilon_{\parallel}-\epsilon_{195}$, where $\epsilon_{\parallel}$ denotes the dielectric constant parallel to the longitudinal axes of the molecules and $\epsilon_{\perp}$ denotes the dielectric constant perpendicular thereto. The electro-optical data were measured in an IPS cell at 20° C., unless expressly stated otherwise. The optical data were measured at 20° C., unless expressly stated otherwise.

An IPS test cell as described in WO 91/10936 having a comb structure was employed, in which the electrodes and the spaces between the electrodes have a separation of 20 μm.

The layer thickness d of the liquid-crystal material is 5 μm. The cell furthermore has:

| | |
|---|---|
| Initial twist angle: | 0° |
| Alignment angle: | 5° |
| Tilt angle | 3° |

The cells are dark in the "off" state.

In the present application and in the examples below, the structures of the liquid-crystal compounds are indicated by acronyms, the transformation into chemical formulae taking place as in Tables A and B below. All the radicals $C_nH_{2n+1}$ are straight-chain alkyl radicals containing n or m [sic] carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| nN.F.F | $C_nH_{2n+1}$ | CN | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{s-}$ | CN | H | H |
| rEsN | $C_rH_{2r+1}$—O—$C_2H_{2s-}$ | CN | H | H |
| nAm | $C_nH_{2n+1}$ | COOC$_m$H$_{2m+1}$ | H | H |
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| nOCF$_3$.F.F | $C_nH_{2n+1}$ | OCF$_3$ | F | F |
| nOCF$_2$.F.F | $C_nH_{2n+1}$ | OCHF$_2$ | F | F |
| nOCF$_3$.F | $C_nH_{2n+1}$ | OCF$_3$ | F | H |

TABLE A
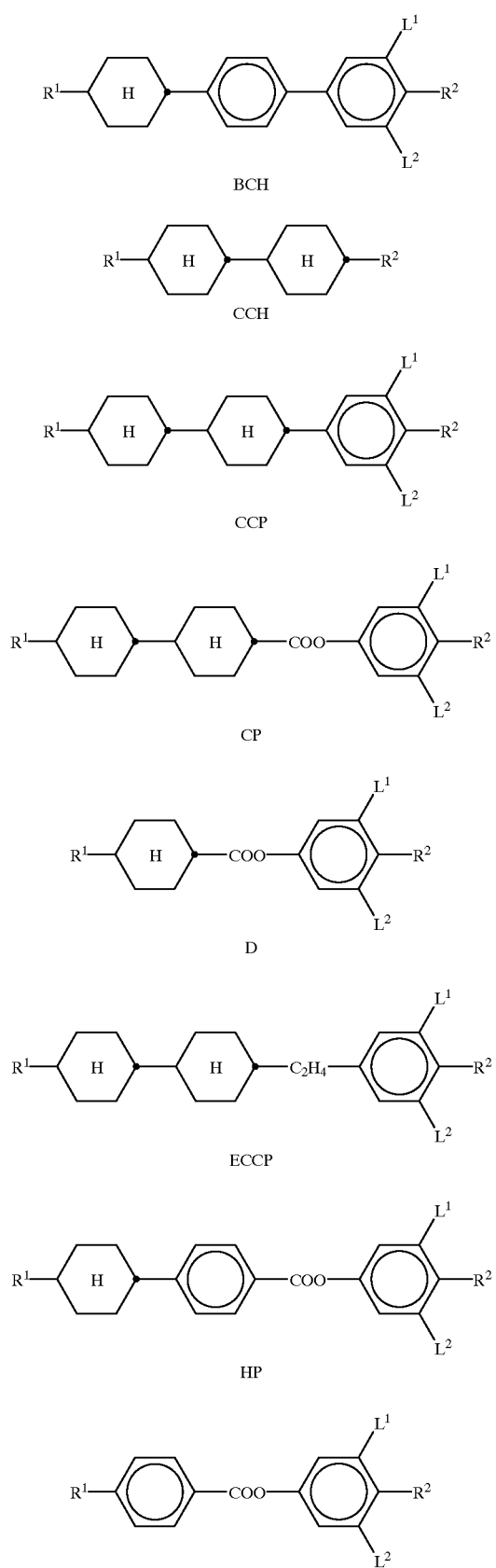
BCH
CCH
CCP
CP
D
ECCP
HP
ME
PCH
CH
PDX
TABLE B
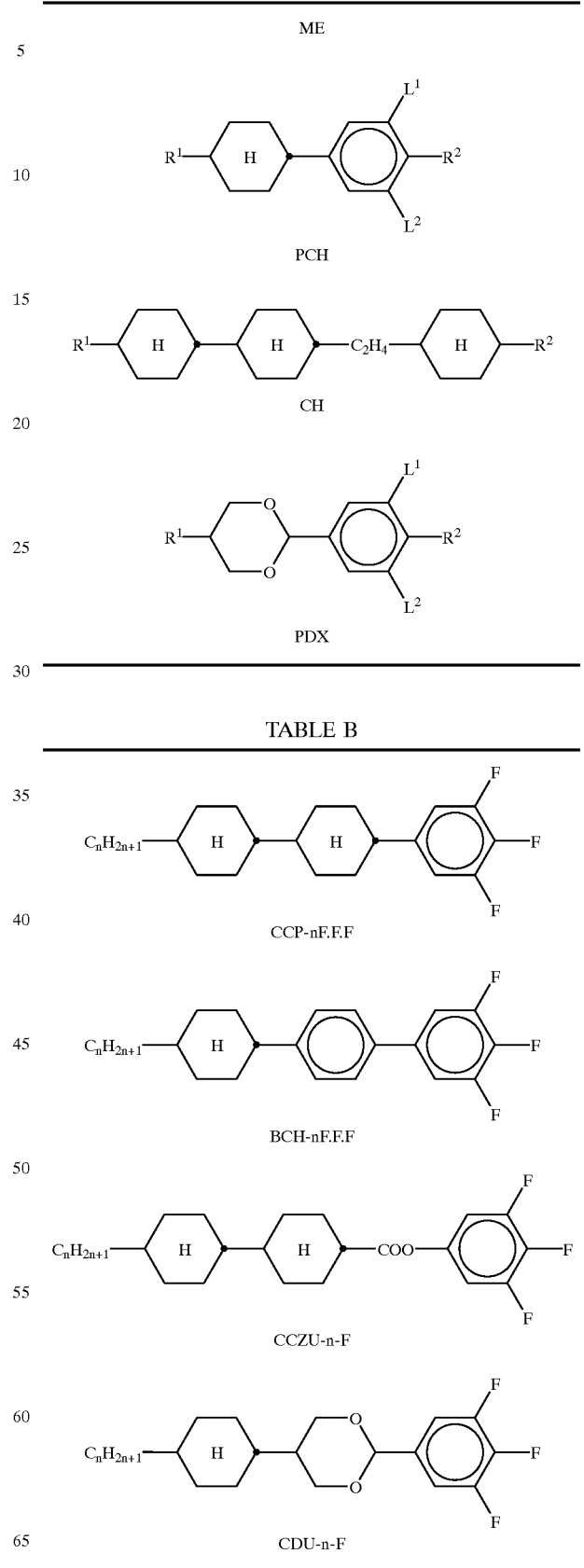
CCP-nF.F.F
BCH-nF.F.F
CCZU-n-F
CDU-n-F

TABLE B-continued

CFU-n-F: C$_n$H$_{2n+1}$—[H]—[cyclohexene with F]—[benzene with F,F,F]

CGU-n-F: C$_n$H$_{2n+1}$—[H]—[benzene with F]—[benzene with F,F,F]

DU-n-N: C$_n$H$_{2n+1}$—[dioxane]—[benzene with F, CN, F]

Even without further comments, it is assumed that a person skilled in the art can use the above description in the broadest scope. The preferred embodiments are therefore merely to be regarded as a descriptive disclosure, and in no way as limiting.

The full disclosure of all the applications, patents and publications mentioned above and below, and the corresponding applications P 195 03 507 of 03.02.1995, P 195 09 791 of 17.03.1995, P 195 28 104 of 01.08.1995

P 195 28 106 of 01.08.1995,

P 195 28 107 of 01.08.1995 and

P 195 37 802 of 11.10.1995 are incorporated in this application by way of reference.

EXAMPLE 1

An IPS display containing a nematic mixture having

| | |
|---|---|
| clearing point | +73° C. |
| Δn | 0.0819 |
| n$_O$ | 1.4784 |
| Δε | 9.0 |
| ε$_\perp$ | 4.3 |
| viscosity (20° C.) | 18 mm$^2$s$^{-1}$ | comprising

| | |
|---|---|
| PCH-3 | 25.00 |
| ME2N.F | 3.00 |
| ME3N.F | 3.00 |
| HP-3N.F | 3.00 |
| CCH-303 | 7.00 |
| CCH-501 | 7.00 |
| CCP-3F.F.F | 9.00 |
| CCP-5F.F.F | 9.00 |
| CCH-34 | 11.00 |
| CCH-35 | 11.00 |
| CH-33 | 3.00 |
| CH-35 | 3.00 |
| CH-43 | 3.00 |
| CH-45 | 3.00 | and has high contrast and low response times.

EXAMPLE 2

An IPS display containing a nematic mixture having

| | |
|---|---|
| clearing point | +75° C. |
| Δn | 0.0805 |
| n$_O$ | 1.4755 |
| Δε | 8.7 |
| ε$_\perp$ | 4.1 |
| viscosity (20° C.) | 24 mm$^2$s$^{-1}$ | comprising

| | |
|---|---|
| PCH-3 | 25.00 |
| CCH-3 | 11.00 |
| CCH-34 | 10.00 |
| CCP-30CF2.F.F | 10.00 |
| CCP-50CF2.F.F | 10.00 |
| CCP-3F.F.F | 10.00 |
| CCP-5F.F.F | 10.00 |
| CH-33 | 4.00 |
| CH-35 | 3.00 |
| CCH-501 | 7.00 | and has high contrast and low response times.

EXAMPLE 3

An IPS display containing a nematic mixture having

| | |
|---|---|
| clearing point | +75° C. |
| Δn | 0.0813 |
| n$_O$ | 1.4760 | comprising

| | |
|---|---|
| PCH-3 | 25.00 |
| CCH-3 | 8.00 |
| CCH-34 | 10.00 |
| CCP-30CF2.F.F | 11.00 |
| CCP-50CF2.F.F | 10.00 |
| CCP-3F.F.F | 11.00 |
| CCP-5F.F.F | 11.00 |
| CH-33 | 4.00 |
| CH-35 | 3.00 |
| CCH-501 | 7.00 | and has high contrast and low response times.

EXAMPLE 4

An IPS display containing a nematic mixture having

| clearing point | 81° C. |
|---|---|
| Δn | 0.0811 |
| $n_O$ | 1.4753 | comprising

| PCH-3 | 25.00 |
|---|---|
| CCH-303 | 9.00 |
| CCH-501 | 9.00 |
| CCP-30CF2.F.F | 11.00 |
| CCP-50CF2.F.F | 11.00 |
| CCP-3F.F.F | 11.00 |
| CCP-5F.F.F | 11.00 |
| CH-33 | 4.00 |
| CH-43 | 3.00CH-35 3.00 |
| CH-45 | 3.00 | and has high contrast and low response times.

EXAMPLE 5

An IPS display containing a nematic mixture having

| clearing point | +77° C. |
|---|---|
| Δn | 0.0820 |
| $n_O$ | 1.4744 | comprising

| PCH-3 | 25.00 |
|---|---|
| CCH-303 | 9.00 |
| CCH-501 | 3.00 |
| CCP-30CF3 | 4.00 |
| CCP-30CF2.F.F1 | 11.00 |
| CCP-50CF2.F.F1 | 11.00 |
| CCP-3F.F.F | 11.00 |
| CCP-5F.F.F | 11.00 |
| CCH-34 | 10.00 |
| CH-35 | 5.00 | and has high contrast and low response times.

EXAMPLE 6

An IPS display containing a nematic mixture having

| clearing point | +77° C. |
|---|---|
| Δn | 0.0832 |
| $n_O$ | 1.4758 | comprising

| PCH-3 | 23.00 |
|---|---|
| OCH-303 | 9.00 |
| CRP-30CF2.F.F | 11.00CCP-50CF2.F.F 11.00 |
| CCP-3F.F.F | 11.00 |
| CCP-5F.F.F | 11.00 |

| CCP-34 | 17.00 |
|---|---|
| BCH-3F.F.F | 4.00 |
| CCPC-33 | 3.00 | and has high contrast and low response times.

EXAMPLE 7

An IPS display containing a nematic mixture having

| clearing point | +69° C. |
|---|---|
| Δn | 0.0811 |
| $n_O$ | 1.4766 |
| Δε | 13.2 |
| $ε_\perp$ | 4.2 |
| S-N | <−30° C. | comprising

| ME2N.F | 4.00 |
|---|---|
| ME3N.F | 4.00 |
| ME5N.F | 10.00 |
| ME7N.F | 5.00 |
| CCH-2 | 12.00 |
| CCH-3 | 12.00 |
| CCH-4 | 12.00 |
| CCP-3F.F.F | 6.00 |
| CCP-5F.F.F | 6.00 |
| CH-33 | 5.00 |
| CH-35 | 5.00 |
| CH-43 | 5.00 |
| CCH-34 | 10.00 |
| CCH-303 | 4.00 | and has high contrast and low response times.

EXAMPLES 8 TO 10

The following example relates to IPS displays containing nematic mixtures which include CFU-n-F

| Example | | 8 | | 9 |
|---|---|---|---|---|
| Clearing point [° C.] | | +88 | | +85 |
| Rot. visc. $γ_1$ [mPa · s] 20° C. | | 136 | | — |
| Spec. resistivity [Ω · cm] (20° C.) | | 2.9E12 | | — |
| Δn (589 nm, 20° C.) | | +0.0769 | | +0.0810 |
| Δε (1 kHz, 20° C.) | | +7.8 | | +9.1 |
| $V_{(10,0.20)}$ [V] | | 1.29 | | 1.05 |
| $V_{(90,0.20)}$ [V] | | — | | — |
| $K_1$ [$10^{-12}$N] 20° C. | | 11.6 | | 9.1 |
| $K_3$ [$10^{-12}$N] 20° C. | | 17.2 | | 18.2 |
| Composition [%]: | PCH-7F | 9.00 | PCH-7F | 7.00 |
| | CCP-20CF2.F.F | 8.00 | CCP-30CF2.F.F | 6.00 |
| | CCP-30CF2.F.F | 6.00 | CCP-50CF2.F.F | 5.00 |
| | CCP-50CF2.F.F | 5.00 | CCP-20CF3 | 8.00 |
| | CCP-20CF3 | 14.00 | CCP-30CF3 | 11.00 |
| | CCP-30CF3 | 12.00 | CCP-50CF3 | 10.00 |
| | CCP-50CF3 | 10.00 | CCP-2F.F.F | 15.00 |
| | CCP-2F.F.F | 16.00 | CCP-3F.F.F | 12.00 |
| | CCP-3F.F.F | 11.00 | CCP-5F.F.F | 10.00 |
| | CCP-5F.F.F | 9.00 | CFU-2-F | 6.00 |

-continued

|  | CFU-3-F | 10.00 |
|---|---|---|

| Example | 10 |
|---|---|
| Clearing point | +74 |
| Rot. visc. $\gamma_1$ [mPa · s] 20° C. | 122 |
| Spec. resistivity [Ω · cm] (20° C.) | 1.7E11 |
| Δn (589 nm, 20° C.) | +0.0800 |
| Δε (1 kHz, 20° C.) | +9.5 |
| $V_{(10.0.20)}$ [V] | 0.95 |
| $V_{(90.0.20)}$ [V] | — |
| $K_1$ [$10^{-12}$N] 20° C. | 7.7 |
| $K_3$ [$10^{-12}$N] 20° C. | 15.7 |

| Composition [%]: | | |
|---|---|---|
| PCH-7F | 8.00 | |
| CCP-30CF2.F.F | 7.00 | |
| CCP-20CF3 | 11.00 | |
| CCP-30CF3 | 13.00 | |
| CCP-2F.F.F | 15.00 | |
| CCP-3F.F.F | 14.00 | |
| CCP-5F.F.F | 9.00 | |
| CFU-2-F | 12.00 | |
| CFU-3-F | 11.00 | |

EXAMPLES 11 TO 14

The following examples relate to IPS displays containing nematic mixtures which include CCZU-n-F

| Example | 11 | | 12 | |
|---|---|---|---|---|
| Clearing point [° C.] | 78 | | +68 | |
| Rot. visc. $\gamma_1$ [mPa · s] 20° C. | 111 | | 108 | |
| Spec. resistivity [Ω · cm] (20° C.) | 2.8E11 | | 3.0e11 | |
| Δn (589 nm, 20° C.) | +0.0765 | | +0.0758 | |
| Δε (1 kHz, 20° C.) | +10.4 | | +10.6 | |
| $V_{(10.0.20)}$ [V] | 0.94 | | 0.87 | |
| $V_{(90.0.20)}$ [V] | — | | — | |
| $K_1$ [$10^{-12}$N] 20° C. | 8.2 | | 7.2 | |
| $K_3$ [$10^{-12}$N] 20° C. | 14.8 | | 14.4 | |
| Composition [%]: | PCH-3 | 17.00 | PCH-7F | 9.00 |
| | CCP-2F.F.F | 16.00 | CCP-2F.F.F | 16.00 |
| | CCP-3F.F.F | 13.00 | CCP-3F.F.F | 13.00 |
| | CCP-5F.F.F | 8.00 | CCP-5F.F.F | 9.00 |
| | CCP-20CF3 | 4.00 | CCP-20CF3 | 16.00 |
| | CCZU-3-F | 16.00 | CCP-30CF3 | 8.00 |
| | CCZU-5-F | 13.00 | PDX-3 | 11.00 |
| | CCH-34 | 8.00 | CCZU-3-F | 10.00 |
| | CCH-35 | 5.00 | CCZU-5-F | 8.00 |

| Example | 13 | | 14 | |
|---|---|---|---|---|
| Clearing point [° C.] | +76 | | +73 | |
| Rot. visc. $\gamma_1$ [mPa · s] 20° C. | 101 | | 105 | |
| Spec. resistivity [Ω· cm] (20° C.) | 4.4e11 | | 2.3e11 | |
| Δn (589 nm, 20° C.) | +0.0762 | | +0.0742 | |
| Δε (1 kHz, 20° C.) | +9.7 | | — | |
| $V_{(10.0.20)}$ [V] | 1.06 | | 0.93 | |
| $V_{(90.0.20)}$ [V] | — | | — | |
| $K_1$ [$10^{-12}$N] 20° C. | 9.7 | | 8.2 | |
| $K_3$ [$10^{-12}$N] 20° C. | 15.4 | | 14.5 | |
| Composition [%]: | CCP-2F.F.F | 12.00 | CCP-2F.F.F | 12.00 |
| | CCP-3F.F.F | 11.00 | CCP-3F.F.F | 9.00 |
| | CCP-5F.F.F | 8.00 | CCP-5F.F.F | 8.00 |
| | CCP-20CF3 | 10.00 | CCP-20CF3 | 5.00 |
| | CCP-30CF3 | 10.00 | CCP-30CF3 | 8.00 |
| | CCP-50CF3 | 10.00 | CCP-50CF3 | 5.00 |
| | PDX-3 | 11.00 | PDX-3 | 11.00 |

-continued

| CCH-35 | 8.00 | CCH-35 | 8.00 |
|---|---|---|---|
| PCH-7F | 7.00 | PCH-7F | 7.00 |
| CCZU-2F | 7.00 | CCZU-2-F | 7.00 |
| CCZU-3F | 6.00 | CCZU-3-F | 13.00 |
| | | CCZU-5-F | 6.00 |

EXAMPLES 15 TO 21

The following examples relate to IPS displays containing nematic mixtures which include CDU-n-F or CGU-n-F

| Example | 15 | | 16 | |
|---|---|---|---|---|
| Clearing point [° C.) | +65 | | +80 | |
| Rot. visc. $\gamma_1$ [mPa · s] 20° C. | 104 | | 136 | |
| Spec. resistivity [Ω · cm] (20° C.) | 3.3e11 | | 4.2E12 | |
| Δn (589 nm, 20° C.) | +0.0703 | | +0.0852 | |
| Δε (1 kHz, 20° C.) | +10.1 | | +10.0 | |
| $V_{(10.0.20)}$ [V] | 1.00 | | 1.05 | |
| $K_1$ [$10^{-12}$N] 20° C. | 9.1 | | 9.9 | |
| $K_3$ [$10^{-12}$N] 20° C. | 13.1 | | 13.6 | |
| Composition [%]: | PCH-7F | 9.00 | CCP-20CF2.F.F | 9.00 |
| | CCP-20CF3 | 16.00 | CCP-20CF3 | 13.00 |
| | CCP-30CF3 | 12.00 | CCP-30CF3 | 10.00 |
| | CCP-2F.F.F | 16.00 | CCP-50CF3 | 8.00 |
| | CCP-3F.F.F | 11.00 | CCP-2F.F.F | 16.00 |
| | CCP-5F.F.F | 9.00 | CCP-3F.F.F | 14.00 |
| | CDU-2-F | 12.00 | CCP-5F.F.F | 12.00 |
| | CDU-3-F | 9.00 | CGU-2-F | 12.00 |
| | CDU-5-F | 6.00 | CGU-3-F | 6.00 |

| Example | 17 | | 18 | |
|---|---|---|---|---|
| Clearing point [° C.) | +64 | | +71 | |
| Rot. visc. $\gamma_1$ [mPa · s] 20° C. | 115 | | 95 | |
| Spec. resistivity [Ω · cm] (20° C.) | 1.3e12 | | 9.0E11 | |
| Δn (589 nm, 20° C.) | +0.0744 | | +0.0758 | |
| Δε(1 kHz, 20° C.) | +10.9 | | +10.4 | |
| $V_{(10.0.20)}$ [V] | 0.90 | | 1.04 | |
| $K_1$ [$10^{-12}$N] 20° C. | 7.8 | | 10.1 | |
| $K_3$ [$10^{-12}$N] 20° C. | 10.9 | | 13.7 | |
| Composition [%]: | CCP-20CF3 | 16.00 | PCH-3 | 11.00 |
| | CCP-30CF3 | 10.00 | CCP-2F.F.F | 16.00 |
| | CCP-2F.F.F | 16.00 | CCP-3F.F.F | 12.00 |
| | CCP-3F.F.F | 14.00 | CCP-5F.F.F | 5.00 |
| | CCP-5F.F.F | 12.00 | CCP-20CF3 | 16.00 |
| | CGU-2-F | 12.00 | CCP-30CF3 | 5.00 |
| | CGU-3-F | 4.00 | CDU-3-F | 22.00 |
| | CDU-2-F | 12.00 | CCH-34 | 8.00 |
| | CDU-3-F | 4.00 | CCH-35 | 5.00 |

| Example | 19 | | 20 | |
|---|---|---|---|---|
| Clearing point [° C.) | +78 | | +65 | |
| Rot. visc. $\gamma_1$ [mPa · s] 20° C. | 86 | | 104 | |
| Spec. resistivity [Ω · cm] (20° C.) | 3.8e12 | | 3.3e11 | |
| Δn (589 nm, 20° C.) | +0.0663 | | +0.0703 | |
| Δε (1 kHz, 20° C.) | +8.0 | | +10.1 | |
| $V_{(10.0.20)}$ [V] | 1.22 | | 1.00 | |
| $K_1$ [$10^{-12}$N] 20° C. | 10.7 | | 9.1 | |
| $K_3$ [$10^{-12}$N] 20° C. | 13.7 | | 13.1 | |
| Composition [%]: | CCP-2F.F.F | 16.00 | PCH-7F | 9.00 |
| | CCP-3F.F.F | 12.00 | CCP-20CF3 | 16.00 |
| | CCP-5F.F.F | 6.00 | CCP-30CF3 | 12.00 |
| | CCP-20CF3 | 16.00 | CCP-2F.F.F | 16.00 |
| | CCP-30CF3 | 10.00 | CCP-3F.F.F | 11.00 |

-continued

| | | | |
|---|---|---|---|
| CDU-2-F | 10.00 | CCP-5F.F.F | 9.00 |
| CDU-3-F | 8.00 | CDU-2-F | 12.00 |
| CDU-5-F | .00 | CDU-3-F | 9.00 |
| CCH-34 | 10.00 | CDU-5-F | 6.00 |
| CCH-35 | 8.00 | | |
| PCH-7F | 4.00 | | |

| Example | 21 | |
|---|---|---|
| Clearing point (° C.) | +60 | |
| Rot. visc. $\gamma_1$ [mPa · s] 20° C. | 109 | |
| Spec. resistivity [$\Omega \cdot$ cm] (20° C.) | — | |
| $\Delta n$ (589 nm, 20° C.) | +0.0756 | |
| $\Delta \epsilon$ (1 kHz, 20° C.) | +13.7 | |
| $V_{(10.0.20)}$ [V] | 0.70 | |
| $K_1$ [$10^{-12}$N] 20° C. | 6.0 | |
| $K_3$ [$10^{-12}$N] 20° C. | 14.5 | |
| Composition [%]: | CCP-2F.F.F | 16.00 |
| | CCP-3F.F.F | 14.00 |
| | CCP-5F.F.F | 11.00 |
| | CCP-2OCF3 | 17.00 |
| | CCP-3OCF3 | 14.00 |
| | PDX-2N.F | 3.00 |
| | PDX-3N.F | 6.00 |
| | PDX-5N.F | 11.00 |
| | CDU-3-F | 8.00 |

EXAMPLE 22

An IPS display containing a nematic mixtures having

| | |
|---|---|
| clearing point | +68° C. |
| $\Delta n$ | 0.0789 |
| $n_O$ | 1.4725 |
| $\Delta \epsilon$ | 12.7 |
| $\epsilon_\perp$ | 5.1 |
| viscosity (20° C.) | 18 mm$^2$s$^{-1}$ |
| $K_1$[$10^{-12}$N] (20° C.) | 7.4 |
| $K_3$[$10^{-12}$N] (20° C.) | 15.6 | comprising

| | |
|---|---|
| PCH-3 | 6.00 |
| CCP-2OCF$_2$.F.F | 12.00 |
| CCP-2F.F.F | 17.00 |
| CCP-3F.F.F | 14.00 |
| CCP-5F.F.F | 13.00 |
| CCP-2OCF$_3$ | 15.00 |
| CCP-3OCF$_3$ | 13.00 |
| PDX-3N.F.F | 5.00 |
| PDX-5N.F.F | 5.00 | and has high contrast and low response times.

EXAMPLE 23

An IPS display containing a nematic mixture having

| | |
|---|---|
| clearing point | 75 |
| $\Delta n$ | 0.0800 |
| $n_O$ | 1.4735 |
| $\Delta \epsilon$ | 11.7 |
| $\epsilon_\perp$ | 4.8 |
| viscosity (20° C.) | 24 mm$^2$s$^{-1}$ | comprising

| | |
|---|---|
| PCH-3 | 6.00 |
| CCP-2OCF$_2$.F.F | 12.00 |
| CCP-2F.F.F | 17.00 |
| CCP-3F.F.F | 14.00 |
| CCP-5F.F.F | 13.00 |
| CCP-2OCF$_3$ | 15.00 |
| CCP-3OCF$_3$ | 13.00 |
| PDX-3N.F.F | 5.00 |
| PDX-5N.F.F | 5.00 | and has high contrast and low response times.

EXAMPLE 24

An IPS display containing a nematic mixture comprising

| | |
|---|---|
| PCH-3 | 10.00 |
| PDX-3N.F | 14.00 |
| PDX-3N.F.F | 9.00 |
| CCP-3OCF2.F.F | 11.00 |
| CCP-5OCF2.F.F | 10.00 |
| CCP-3F.F.F | 11.00 |
| CCP-5F.F.F | 11.00 |
| CH-33 | 4.00 |
| CH-35 | 3.00 |
| CCH-501 | 7.00 | and has high contrast and low response times.

EXAMPLE 25

An IPS display containing a nematic mixture having

| | | | |
|---|---|---|---|
| PCH-3 | 7.00 | clearing point | +60° C. |
| PCH-7F | 2.00 | $\Delta n$ | 0.0798 |
| CCP-2F.F.F | 16.00 | $\Delta \epsilon$ | +12.6 |
| CCP-3F.F.F | 10.00 | $\epsilon_\perp$ | 5.6 |
| CCP-5F.F.F | 9.00 | E | 18.2 |
| CCP-2OCF$_3$ | 16.00 | rotational viscosity (20° C.) | 97 mPa · s |
| CCP-3OCF$_3$ | 15.00 | $V_{10}$ | 0.77 V |
| CCP-4OCF$_3$ | 5.00 | spec. resistance | 4.9 · $10^{10}$ $\Omega \cdot$ cm |
| PDX-2N.F | 5.00 | $K_1$ | 6.6 · $10^{-12}$ N |
| PDX-3N.F | 5.00 | $K_3$ | 14.7 · $10^{-12}$N |
| PDX-5N.F | 4.00 | | |
| PDX-3 | 6.00 | | | and has high contrast and low response times.

EXAMPLE 26

An IPS display containing a nematic mixture having

| | | | |
|---|---|---|---|
| PCH-3 | 11.00 | clearing point | +83° C. |
| CCP-2F.F.F | 16.00 | $\Delta n$ | 0.0809 |
| CCP-3F.F.F | 10.00 | $\Delta \epsilon$ | +10.3 |
| CCP-5F.F.F | 7.00 | $\epsilon_\perp$ | +4.0 |
| CCP-2OCF$_3$ | 16.00 | rotational viscosity (20° C.) | 105 mPa · s |
| CCP-3OCF$_3$ | 15.00 | $V_{10}$ | 1.05 V |

-continued

| | | | |
|---|---|---|---|
| CCP-5OCF$_3$ | 11.00 | spec. resistance | $3.4 \cdot 10^{11}$ Ω · cm |
| PDX-2N.F | 5.00 | | |
| CCH-34 | 6.00 | | | and has high contrast and low response times.

EXAMPLE 27

An IPS display containing a nematic mixture having

| | | | |
|---|---|---|---|
| PCH-3 | 6.00 | clearing point | +68° C. |
| CCP-2OCF2.F.F | 12.00 | Δn | 0.0789 |
| CCP-2F.F.F | 17.00 | Δε | 12.7 |
| CCP-3F.F.F | 14.00 | ε$_\perp$ | 5.1 |
| CCP-2OCF$_3$ | 15.00 | V$_{10}$ | 0.81 V |
| CCP-3OCF$_3$ | 13.00 | K$_1$ | $7.4 \cdot 10^{-12}$ N |
| DU-3-N | 5.00 | K$_3$ | $15.6 \pm 10^{-12}$ N |
| CU-5-N | 5.00 | | | and has high contrast and low response times.

EXAMPLE 28

An IPS display containing a nematic mixture having

| | | | |
|---|---|---|---|
| CCP-2F.F.F | 16.00 | clearing point | +60° C. |
| CCP-3F.F.F | 14.00 | Δn | 0.0756 |
| CCP-5F.F.F | 11.00 | Δε | +13.7 |
| CCP-2OCF$_3$ | 17.00 | ε$_\perp$ | +6.1 |
| CCP-3OCF$_3$ | 14.00 | rotational viscosity (20° C.) | 109 mPa · s |
| PDX-2N.F$_3$ | 3.00 | V$_{10}$ | 0.70 V |
| PDX-3N.F | 6.00 | K$_1$ | $6.0 \cdot 10^{-12}$ N |
| PDX-5N.F | 11.00 | K$_3$ | $14.5 \cdot 10^{-12}$ N |
| CDU-3-F | 8.00 | | | and has high contrast and low response times.

EXAMPLE 29

An IPS display containing a nematic mixture having

| | | | |
|---|---|---|---|
| PCH-3 | 7.00 | clearing point | +71° C. |
| CCP-2F.F.F | 16.00 | Δn | 0.0777 |
| CCP-3F.F.F | 7.00 | Δε | +10.6 |
| CCP-5F.F.F | 9.00 | ε$_\perp$ | 4.7 |
| CCP-2OCF$_3$ | 16.00 | rotational viscosity (20° C.) | 88 mPa · s |
| CCP-3OCF$_3$ | 15.00 | V$_{10}$ | 0.94 V |
| CCP-5OCF$_3$ | 4.00 | K$_1$ | $8.5 \cdot 10^{-12}$ N |
| PDX-2N.F | 5.00 | K$_3$ | $15.2 \cdot 10^{-12}$ N |
| PDX-3N.F | 5.00 | | |
| PDX-5N.F | 3.00 | | |
| CCH-34 | 8.00 | | |
| CCH-35 | 5.00 | | | and has high contrast and low response times.

EXAMPLE 30

An IPS display contains a nematic mixture having

| | | | |
|---|---|---|---|
| CCP-2F.F.F | 16.00 | clearing point | +76° C. |
| CCP-3F.F.F | 13.00 | Δε | +9.0 |
| CCP-5F.F.F | 9.00 | ε$_\perp$ | +3.9 |
| CCP-2OCF$_3$ | 16.00 | Δn | 0.0768 |
| CCP-3OCF$_3$ | 15.00 | V$_{10}$ | 1.16 V |
| CCP-5OCF$_3$ | 5.00 | rotational viscosity (20° C.) | 93 mPa · s |
| PDX-3 | 11.00 | spec. resistance | $2.3 \cdot 10^{12}$ Ω · cm |
| CCH-34 | 10.00 | | |
| PCH-7F | 5.00 | | | which has high contrast and low response times.

EXAMPLE 31

An IPS display containing a nematic mixture having

| | |
|---|---|
| clearing point | +68° C. |
| Δn | 0.0776 |
| n$_o$ | 1.4725 |
| Δε | +10.6 |
| ε$_\perp$ | 5.1 |
| rotational viscosity (20° C.) | 82 mPa · s |
| K$_1$ [$10^{-12}$ N] (20° C.) | 9.8 |
| K$_3$ [$10^{-12}$ N] (20° C.) | 12.1 |
| spec. resistance | $6.7 \cdot 10^{11}$ Ω cm | comprising

| | |
|---|---|
| PCH-3 | 8.00 |
| CCP-2F.F.F | 13.00 |
| CCP-3F.F.F | 7.00 |
| CCP-5F.F.F | 9.00 |
| CCP-2OCF$_3$ | 16.00 |
| CCP-3OCF$_3$ | 15.00 |
| CCP-5OCF$_3$ | 5.00 |
| PCH-2N.F.F | 6.00 |
| PCH 3N.F.F | 8.00 |
| CCH-34 | 8.00 |
| CCH-35 | 5.00 | and has high contrast and low response times.

EXAMPLE 32

An IPS display containing a nematic mixture having

| | |
|---|---|
| clearing point | +76° C. |
| Δn | 0.0776 |
| n$_o$ | 1.4725 |
| Δε | +10.8 |
| ε$_\perp$ | 4.4 |
| K$_1$ [$10^{-12}$ N] (20° C.) | 8.1 |
| K$_3$ [$10^{-12}$ N] (20° C.) | 12.9 | comprising

| | |
|---|---|
| PCH-3 | 5.00 |
| CCP-2F.F.F | 13.00 |
| CCP-3F.F.F | 9.00 |
| CCP-5F.F.F | 9.00 |
| CCP-2OCF$_3$ | 15.00 |
| CCP-3OCF$_3$ | 14.00 |
| CCP-5OCF$_3$ | 5.00 |
| D-3N.F.F. | 12.00 |

| -continued | |
|---|---|
| D-5N.F | 5.00 |
| CCH-34 | 8.00 |
| CCH-35 | 5.00 | and has high contrast and low response times.

The IPS displays of Examples 1 to 32 are distinguished by low addressing voltage and give good voltage holding ratio values in cells as per embodiment 1 of EP 0 58 568.

COMPARATIVE EXAMPLE

An IPS display containing a nematic mixture

| clearing point | 64° C. |
|---|---|
| Δn | 0.0813 |
| Δε | +12.0 | comprising

| ME2N.F | 4.00 |
|---|---|
| ME3N.F | 4.00 |
| ME5N.F | 10.00 |
| ME7N.F | 6.00 |
| CCH-2 | 12.00 |
| CCH-3 | 12.00 |
| CCH-4 | 12.00 |
| CCP-30CF3 | 6.00 |
| CCP-50CF3 | 6.00 |
| CH-33 | 3.00 |
| CH-35 | 3.00 |
| CCH-34 | 10.00 |
| CCH-35 | 4.00 |
| CCH-303 | 4.00 |
| CCH-501 | 4.00 | and has lower contrast and a higher response time than the displays of Examples 1 to 32.

What is claimed is:

1. Electro-optical liquid crystal display having a realignment layer for realigning the liquid crystals whose field has a significant component parallel to the liquid crystal layer and which contains a liquid-crystalline medium of positive dielectric anisotropy, characterized in that the medium comprises at least one compound selected from the group of formulae Ia and Ib

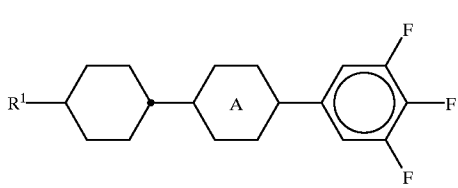

Ia

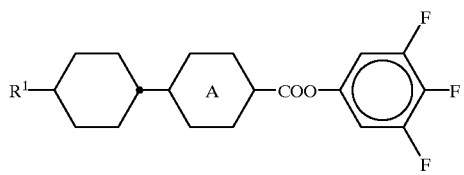

Ib in which

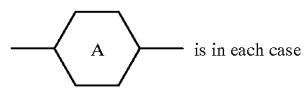 is in each case

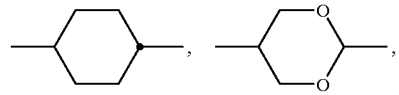,

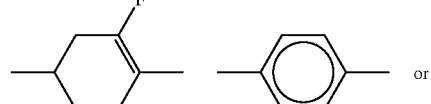 or

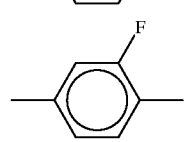

and $R^1$ is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—, —CO—, —CO—O—, —O—CO— or —O—CO—O— in such a way, that O-atoms are not linked directly to one another, and at least one compound selected from the group of formulae IVa and IVb

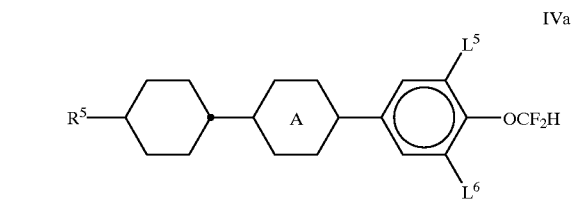

IVa

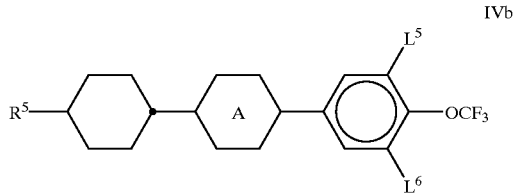

IVb in which $R^5$ is as defined for $R^1$ and/or at least one compound of formula I which is different from the compounds of formulae Ia and Ib

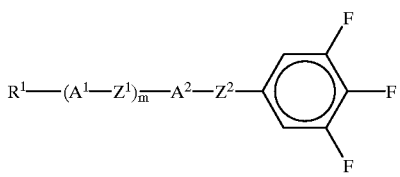

in which

R$^1$ is H, an alkyl or alkenyl radical having 1 to 10 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

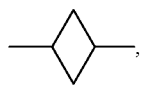

—CO, —CO—O, —O—CO— or —O—CO—O— in such a way that O-atoms are not linked directly to one another, A$^1$ and
A$^2$ are each, independently of one another, a
   (a) trans-1,4-cyclohexylene radical or 1,4-cyclohexenylene radical, in which, in addition, one or more non-adjacent CH$_2$ groups may be replaced by —O— and/or —S—,
   (b) 1,4-phenylene radical, in which, in addition, one or two CH-groups may be replaced by N,
   (c) radical from the group consisting of 1,4-dicyclo (2,2,2)octylene, piperidine-1,4-diyl, napthaline-2,6-diyl, decahydronaphthaline-2,6-diyl and 1,2,3,4,-tetrahydronaphthaline-2,6-diyl where the radicals (a) and (b) may be substituted by one two fluorine atoms, Z$^1$ and
Z$^2$ are each, independently of one another, —CO—O—, —O—CO—, —CH$_2$O—, —OCH$_2$—, —CH$_2$CH$_2$—, —CH═CH—, —C≡C—, or a single bond, or one of the radicals Z$^1$ and Z$^2$ is —(CH$_2$)$_4$— or —CH═CH—CH$_2$CH$_2$— and m is 0, 1 or 2.

2. Electrooptical liquid crystal display according to claim 1, characterized in that it comprises at least one compound of formula I in which A$^1$ is

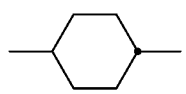

and

A$^2$ is

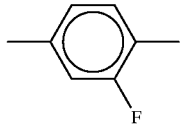

Z$^1$ and Z$^2$ are a single bond and m is 1.

3. Electrooptical liquid crystal display according to claim 1, characterized in that it comprises at least one compound of formula I in which A$^1$ is

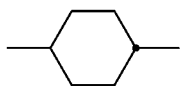

and

A$^2$ is

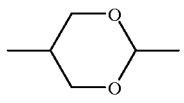

4. Electrooptical liquid crystal display according to claim 2, characterized in that it comprises at least one compound of formula I in which A$^1$ is

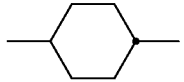

and

A$^2$ is

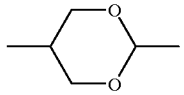

5. Electrooptical crystal display according to claim 1, characterized in that compound of formula I in which A$^1$ is

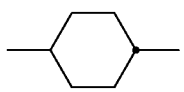

and

A² is

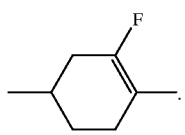

6. Electrooptical crystal display according to claim 2, characterized in that compound of formula I in which A¹ is

and

A² is

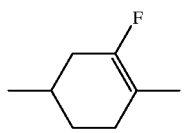

7. An electrooptical liquid crystal display according to claim 1, which comprises at least one compound of formula Ia or Ib which is selected from the group of compounds consisting of:

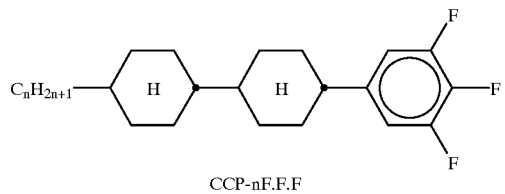

CCP-nF.F.F

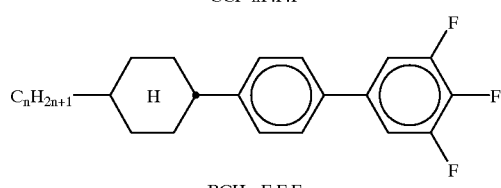

BCH-nF.F.F.

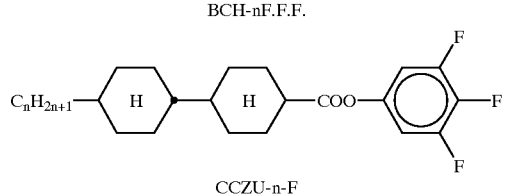

CCZU-n-F

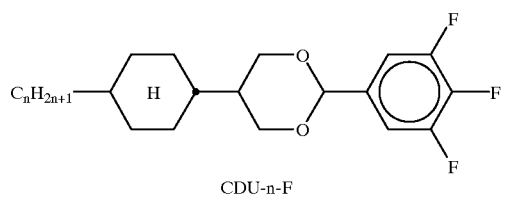

CDU-n-F

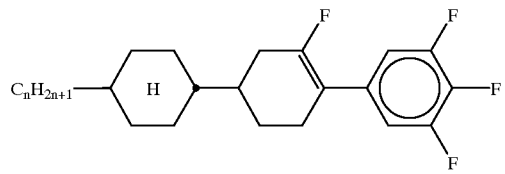

CFU-n-F

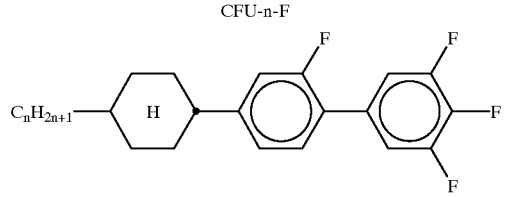

CGU-n-F and

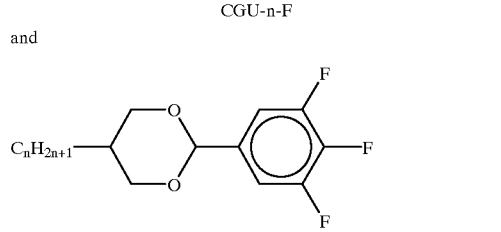

DU-n-N wherein $C_nH_{2n+1}$ is a straight claim alkyl group with n C-atoms, wherein n=1–7.

8. An electrooptical liquid crystal display according to claim 2, which comprises at least one compound of Formula Ia or Ib which is selected from the group of compounds consisting of:

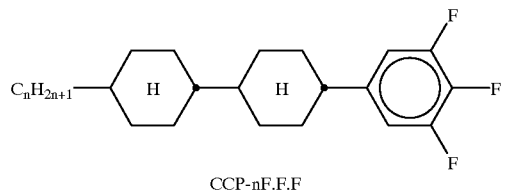

CCP-nF.F.F

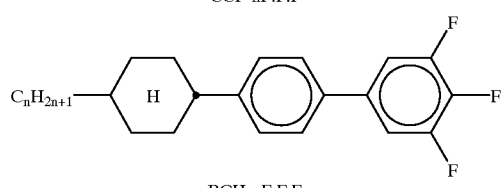

BCH-nF.F.F.

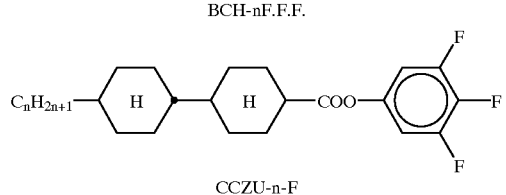

CCZU-n-F

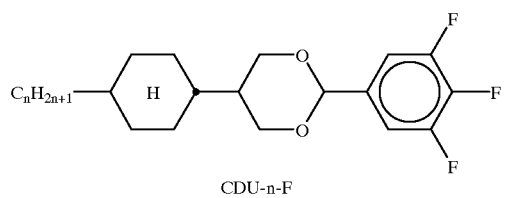

CDU-n-F

-continued

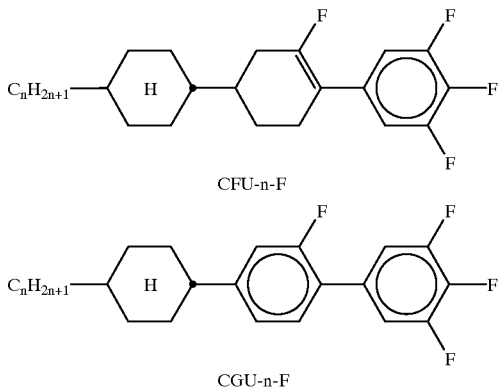

CFU-n-F

CGU-n-F and

DU-n-N wherein $C_nH_{2n+1}$ is a straight chain alkyl group with n c-atoms, wherein n=1–7.

9. Electrooptical liquid crystal display according to claim 1, characterized in that the liquid crystalline medium has a dielectric anisotropy $\Delta\epsilon > 8.5$.

10. Electrooptical liquid crystal display according to claim 2, characterized in that the liquid crystalline medium has a dielectric anisotropy $\Delta\epsilon > 8.5$.

11. Electrooptical liquid crystal display according to claim 1, characterized in that the liquid crystalline medium contains at least one compound of formula III.

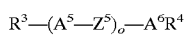

$$R^3\text{—}(A^5\text{—}Z^5)_o\text{—}A^6R^4 \quad\quad III$$

in which $R^3$ and $R^4$ are each, independently or one another, as defined for $R^1$, $A^5$ and $A^6$ are each, independently of one another as defined for $A^1$ and $A^2$, $Z^5$ is in each case, independently of the others, as defined for $Z^1$ and $Z^2$, and o is 1, 2 or 3.

12. Electrooptical liquid crystal display according to claim 2, characterized in that the liquid crystalline medium contains at least one compound of formula III.

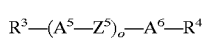

$$R^3\text{—}(A^5\text{—}Z^5)_o\text{—}A^6\text{—}R^4 \quad\quad III$$

in which $R^3$ and $R^4$ are each, independently or one another, as defined for $R^1$, $A^5$ and $A^6$ are each, independently of one another as defined for $A^1$ and $A^2$, $Z^5$ is in each case, independently of the others, as defined for $Z^1$ and $Z^2$, and o is 1, 2 or 3.

13. Electrooptical liquid crystal display according to claim 1, characterized in that the liquid crystalline medium contains at least one compound of formula IV

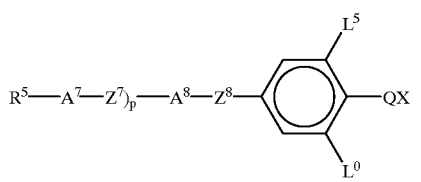

IV in which $R^5$ is as defined for $R^1$, $A^7$ and $A^8$ are each, independently of one another, as defined for $A^1$ and $A^2$, $Z^7$ and $Z^8$ are each, independently of one another as defined for $Z^1$ and $Z^2$, $L^5$ and $L^6$ are each, independently of one another, H or F, Q is a polyfluoroalkylene radical of the formula

$$\text{—}(O)_q\text{—}(CH_2)_r\text{—}(CF_2)_s\text{—}$$

in which q is 0 or 1 r is 0 or an integer between 1 and 6, and s is an integer between 1 and 6,

X is H, F or Cl, and p is 0, 1 or 2.

14. Electrooptical liquid crystal display according to claim 2, characterized in that the liquid crystalline medium contains at least one compound of formula IV

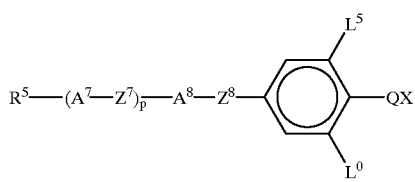

IV in which $R^5$ is as defined for $R^1$, $A^7$ and $A^8$ are each, independently of one another, as defined for $A^1$ and $A^2$, $Z^7$ and $Z^8$ are each, independently of one another as defined for $Z^1$ and $Z^2$, $L^5$ and $L^6$ are each, independently of one another, H or F, Q is a polyfluoroalkylene radical of the formula

$$\text{—}(O)_q\text{—}(CH_2)_r\text{—}(CF_2)_s\text{—}$$

in which q is 0 or 1 r is 0 or an integer between 1 and 6, and s is an integer between 1 and 6,

X is H, F or Cl, and p is 0, 1 or 2.

15. A liquid crystalline medium, having positive dielectric anisotropy which comprises at least one compound selected from the group of formulae Ia and Ib.

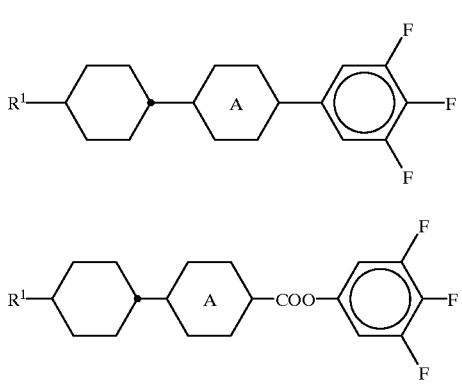

in which

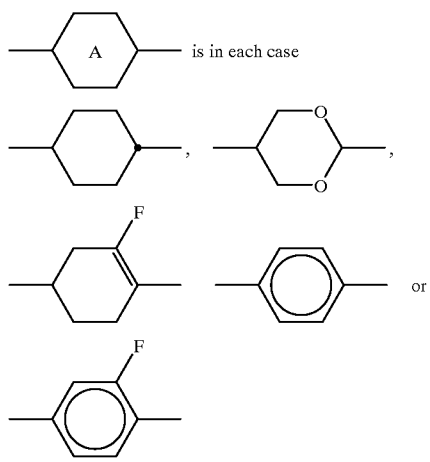

and

R$^1$ is H, an alkyl or alkenyl radical having 1 to 15 carbon atoms which is unsubstituted, monosubstituted by CN or CF$_3$ or at least monosubstituted by halogen, where one or more CH$_2$ groups in these radicals may also, in each case independently of one another, be replaced by —O—, —S— —CO—, —CO—O—, —O—CO— or —O—CO—O— in such a way, that O-atoms are not linked directly to one another, and at least one compound selected from the group of formulae IVa and IVb

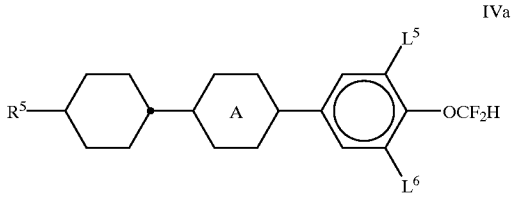

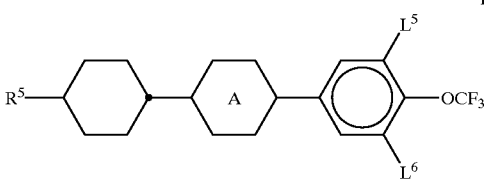

in which R$^5$ is as defined for R$^1$ and/or at least one compound of formula I which is different from the compounds of formulae Ia and Ib

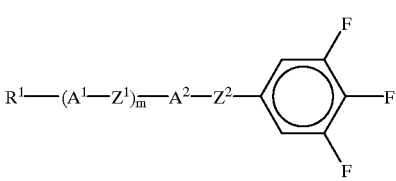

in which

R$^1$ is H, an alkyl or alkenyl radical having 1 to 10 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

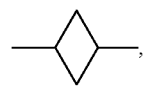

—CO, —CO—O, —O—CO— or —O—CO—O— in such a way that O-atoms are not linked directly to one another, A$^1$ and A$^2$ are each, independently of one another, a
  (a) trans-1,4-cyclohexylene radical or 1,4-cyclohexenylene radical, in which, in addition, one or more non-adjacent CH$_2$ groups may be replaced by —O— and/or —S—,
  (b) 1,4-phenylene radical, in which, in addition, one or two CH-groups may be replaced by N,
  (c) radical from the group consisting of 1,4-dicyclo (2,2,2)octylene, piperidine-1,4-diyl, napthaline-2,6-diyl, decahydronaphthaline-2,6-diyl and 1,2,3,4,-tetrahydronaphthaline-2,6-diyl where the radicals (a) and (b) may be substituted by one two fluorine atoms, Z$^1$ and Z$^2$ are each, independently of one another, —CO—O—, —O—CO—, —CH$_2$O—, —OCH$_2$—, —CH$_2$CH$_2$—, —CH=CH—, —C≡C—, or a single bond, or one of the radicals Z$^1$ and Z$^2$ is —(CH$_2$)$_4$— or —CH=CH—CH$_2$CH$_2$— and m is 0, 1 or 2.

16. A liquid crystalline medium according to claim 15, which comprises at least one compound of formula I in which $A^1$ is

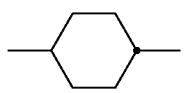

and $A^2$ is

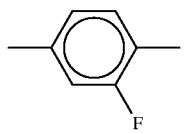

$Z^1$ and $Z^2$ are a single bond and m is 1.

17. A liquid crystalline medium according to claim 15 which comprises at least one compound of formula Ia or Ib which is selected from the group consisting of:

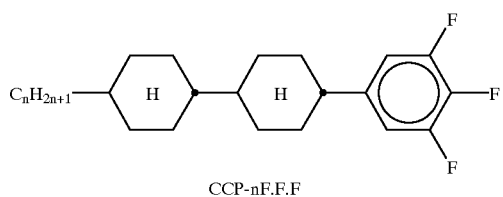

CCP-nF.F.F

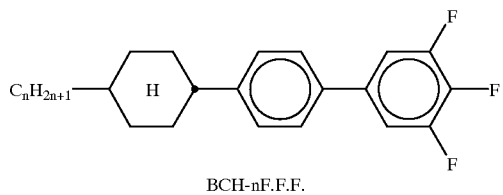

BCH-nF.F.F.

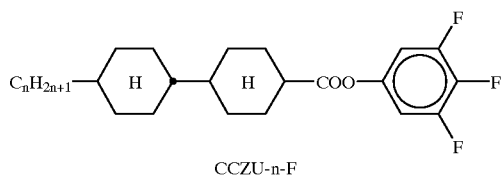

CCZU-n-F

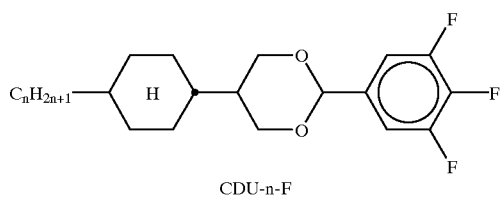

CDU-n-F

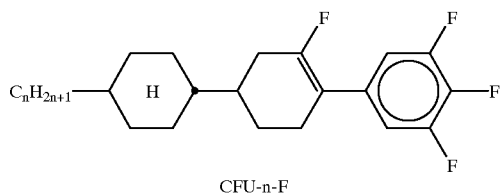

CFU-n-F

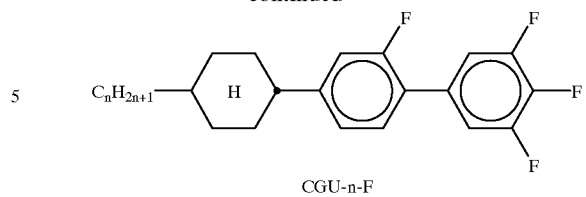

CGU-n-F and

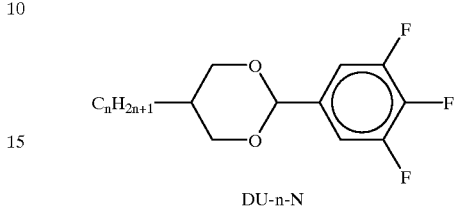

DU-n-N wherein $C_nH_{2n+1}$ is a straight chain alkyl group with n C-atoms, wherein n=1–7.

18. A liquid crystalline medium according to claim 15, having a dielectric anisotropy $\Delta\epsilon > 8.5$.

19. A liquid crystalline medium according to claim 15, which contains at least one compound of formula III.

$$R^3\text{---}(A^5\text{---}Z^5)_o\text{---}A^6\text{---}R^4 \qquad \text{III}$$

in which $R^3$ and $R^4$ are each, independently or one another, as defined for $R^1$, $A^5$ and $A^6$ are each, independently of one another as defined for $A^1$ and $A^2$, $Z^5$ is in each case, independently of the others, as defined for $Z^1$ and $Z^2$, and o is 1, 2 or 3.

20. A liquid crystalline medium according to claim 19, which contains at least one compound of formula IV

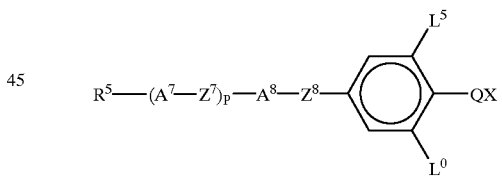

in which $R^5$ is as defined for $R^1$, $A^7$ and $A^8$ are each, independently of one another, as defined for $A^1$ and $A^2$, $Z^7$ and $Z^8$ are each, independently of one another as defined for $Z^1$ and $Z^2$, $L^5$ and $L^6$ are each, independently of one another, H or F, Q is a polyfluoroalkylene radical of the formula $$\text{---}(O)_q\text{---}(CH_2)_r\text{---}(CF_2)_s\text{---}$$

in which q is 0 or 1 r is 0 or an integer between 1 and 6, and s is an integer between 1 and 6,

X is H, F or Cl, and p is 0, 1 or 2.

21. A liquid crystalline medium according to claim 20, which contains 10 to 60 mass % of at least one compound of formula I, 15 to 40 mass % of at least one compound of formula II,

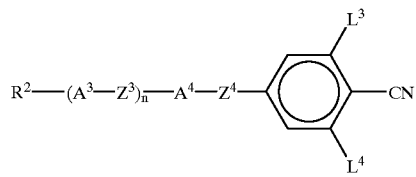

II in which $L^3$ and $L^4$ are each H or F, $R^2$ is as defined for R' of formula I, $A^3$ and $A^4$ are as defined for $A^1$ and $A^2$ of formula I $Z^3$ and $Z^4$ are as defined for $Z^1$ and $Z^2$ of formula I and n is 0, 1 or 2, 20 to 55 mass % of at least one compound of formula III, and 0 to 30 mass % of at least one compound of formula IV.

* * * * *